Nov. 15, 1955 P. R. TIERNEY 2,723,692
CORNER CLAMP
Filed Nov. 29, 1952
Fig. 1.
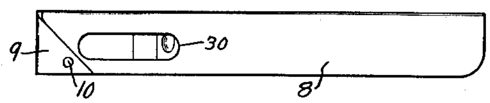
Fig. 2.
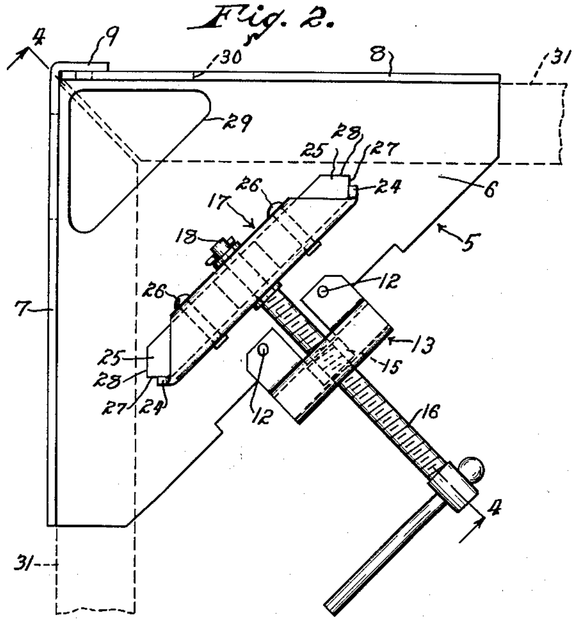
Fig. 3.
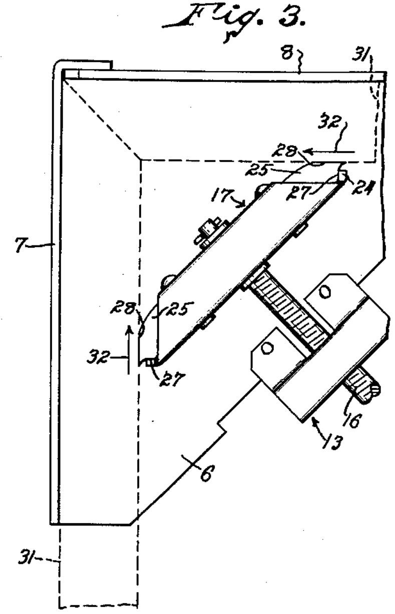
Fig. 4.
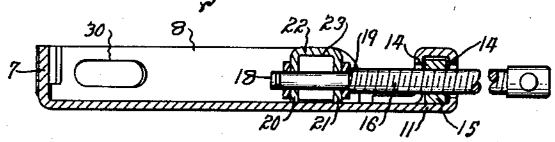
Fig. 5.
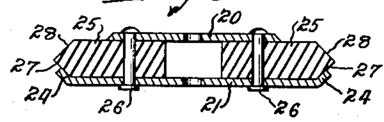
Fig. 6.
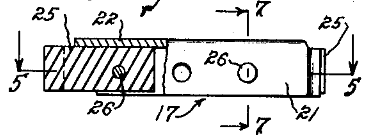
Fig. 7.
22 23 25 26 20 21
INVENTOR.
PETER R. TIERNEY
BY Louis V. Lucas
ATTORNEY United States Patent Office 2,723,692

Patented Nov. 15, 1955

2,723,692

CORNER CLAMP

Peter R. Tierney, Manchester, Conn., assignor, by mesne assignments, to The Gunver Manufacturing Company, Manchester, Conn., a corporation of Connecticut Application November 29, 1952, Serial No. 323,260

2 Claims. (Cl. 144—293)

This invention relates to a corner clamp and especially to improvements on the corner clamp disclosed in my co-pending application Serial No. 269,165, filed January 31, 1952, and now abandoned.

Such corner clamps are particularly useful for clamping and holding the adjacent side members of a picture frame or the like in proper position while the mitered ends of said members are glued together, or otherwise fastened, to form a corner of said frame.

An object of this invention is to provide a corner clamp having a movable clamping bar that carries resilient means which engage the adjacent side members of a picture frame or the like and urge the mitered ends of said members securely together to permit the formation of a highly satisfactory joint.

A further object of the invention is to provide a clamping bar for such a unit which will not mar or in any way damage the frame members engaged thereby.

A still further object of the invention is to provide resilient means on the clamping bar of a corner clamp which conform to the shape of the frame members, thereby rendering said clamp particularly useful for clamping the corner portions of picture frames which are constructed of molding having edges of an irregular contour.

Further objects and advantages of this invention will be more clearly understood from the following description and the accompanying drawings in which:

Fig. 1 is a side view of the corner clamp embodying my invention.

Fig. 2 is a plan view of said corner clamp illustrating the clamping bar in retracted position.

Fig. 3 is a view similar to Fig. 2, but illustrating the clamping bar in clamping position.

Fig. 4 is a sectional side view on line 4—4 of Fig. 2.

Fig. 5 is a sectional view of the clamping bar taken on line 5—5 of Fig. 6.

Fig. 6 is a rear view of said clamping bar with portions broken away to illustrate its construction.

Fig. 7 is an end view thereof taken on line 7—7 of Fig. 6.

In the embodiment of my invention which is illustrated in the drawings, the numeral 5 denotes the frame of my improved corner clamp which preferably comprises a triangular base portion 6 having perpendicular upstanding walls 7 and 8 at the adjoining sides thereof; the said walls being preferably upturned from the material of the base. The wall 7 has an extension 9 which overlaps the wall 8 and is secured thereto by spot-welding 10, or the like, to strengthen the said walls.

The base 6 has an extension 11 which is bent upwardly, inwardly, downwardly, and then again inwardly and is secured to the said base portion by being spot-welded thereto as at 12—12. This extension provides a tubular anchoring portion 13 having openings 14—14 in the opposite walls thereof and which is adapted to contain a nut 15 that is threaded to a clamping screw 16 extending through said openings.

The clamping screw 16 is rotatably secured to the inner end of a clamping bar 17 and the said screw has a reduced portion 18 which extends through the said clamping bar and provides a shoulder 19 that acts as an abutment for forcing said bar into clamping position.

The said clamping bar is constructed of an inverted U-shaped member having a front wall 20, a rear wall 21 and an upper wall 22 forming a channel 23 through the said bar. The opposite ends of said clamping bar extend parallel to their respective side walls 7 and 8 and are each provided with an angularly disposed prong 24 which extends from the rear wall 21 of said bar.

The present invention is particularly directed to the provision of a pair of plugs 25—25 which are preferably of rubber, or the like, and are carried in the channel 23 in said clamping bar and project from the opposite ends thereof as illustrated in the drawings. Each of the plugs is retained in the channel by a rivet 26 which extends therethrough and through the walls 20 and 21 of said clamping bar. The rear edge 27 of each of said plugs is disposed at an angle and is supported against the inner surface of its respective prong 24. The outer end of each plug extends parallel to its respective side wall 7 and 8 and provides a work-engaging surface 28 thereon.

The base portion 6 has an opening 29 therein adjacent its corner, and separate openings 30—30 are provided in the side flanges 7 and 8; said openings 30—30 also being adjacent the corner of the base portion.

In the use of the above described corner clamp, the side members of a picture frame or the like, indicated at 31—31, are first mitered and then placed within the clamp against the side walls 7 and 8, as illustrated in Fig. 2. The clamping bar 17 is then moved, by rotating the screw 16, so that the end portions 28 of the rubber plugs will engage said side members.

As the rubber plugs are urged against the side members 31—31 by rotation of the screw 16, the rubber plugs will bend over the supporting prong 24 and into the position illustrated in Fig. 3 and, due to the resiliency of said rubber plugs, and their tendency to return to normal position, a constant force will be exerted on said side members, in the direction of the arrows 32—32, which will urge the mitered ends of said side members 31—31 together to thereby permit the construction of a good corner joint. If the side members are inadvertently placed in the clamp with their mitered edges in spaced relation, as illustrated in Fig. 2, the rubber plugs will, upon engagement with said side members, urge the mitered ends together as shown in Fig. 3. The force exerted by said rubber plugs will be maintained during the entire time the side members are within the clamp, which is particularly advantageous when said ends are being glued.

If desired, fastening members, such as brads or staples, may be driven into the edges of the side members through the openings 30—30 and into the bottoms of the side members through the opening 29. Such fastening members may also be driven into the tops of the side member since they are always accessible through the open side of the clamp.

The provision of the rubber plugs 25—25 is highly advantageous when using the corner clamp to construct frames from molding or the like having an irregular edge since the rubber will conform to the shape of the edge and grip the side member firmly. Furthermore, the rubber plugs will not damage such an edge.

It will be understood that a single piece of resilient material may be contained in the channel 23 or that the entire clamping bar 17 may be replaced by a bar constructed of a resilient material, such as spring metal, rubber, or plastic, without departing from the scope of my invention.

I claim:

1. In a corner clamp comprising a base having vertically extending walls along two adjoining sides of said base disposed angularly with respect to each other; a rigid clamping bar, a resilient plug member extending from each end of said clamping bar, a clamping screw anchored on said base for moving the clamping bar forwardly and forcing said plugs into engagement with two adjacent members located against said walls whereby said resilient plugs will flex rearwardly and, due to their resiliency, will urge the end portions of said members securely together.

2. In a corner clamp comprising a base having vertically extending walls along two adjoining sides disposed angularly with respect to each other, a clamping bar movable relatively to said base; said clamping bar being constructed of sheet metal and in an inverted U-shape forming a channel in said bar, a resilient plug secured in and extending from each end of said channel, a clamping screw for moving said bar forwardly to force said plugs into engagement with two adjacent side members located against said side walls whereby said plugs will flex rearwardly and, due to their resiliency, will exert a force on said side members parallel to the adjacent walls for urging the ends of said members securely together.

References Cited in the file of this patent

UNITED STATES PATENTS

| | | |
|---|---|---|
| 1,246,466 | Reeves | Nov. 13, 1917 |
| 1,416,874 | Reeves | May 23, 1922 |
| 2,498,725 | Thornburg | Feb. 28, 1950 |
| 2,535,210 | Jackson | Dec. 26, 1950 |

FOREIGN PATENTS

| | | |
|---|---|---|
| 12,919 | Great Britain | June 9, 1898 |
| 231,520 | Germany | Feb. 25, 1911 |
| 276,219 | Switzerland | Oct. 1, 1951 |